A. R. McCORMICK.
HOSE CLAMP AND SUPPORT.
APPLICATION FILED APR. 20, 1910.

989,382.

Patented Apr. 11, 1911.

Inventor
Anthony R. McCormick.

Witnesses
J. H. Crawford

By Victor J. Evans
Attorney

UNITED STATES PATENT OFFICE.

ANTHONY R. McCORMICK, OF CALUMET, MICHIGAN.

HOSE CLAMP AND SUPPORT.

989,382.

Specification of Letters Patent.

Patented Apr. 11, 1911.

Application filed April 20, 1910. Serial No. 556,497.

*To all whom it may concern:*

Be it known that I, ANTHONY R. MCCORMICK, a citizen of the United States of America, residing at Calumet, in the county of Houghton and State of Michigan, have invented new and useful Improvements in Hose Clamps and Supports, of which the following is a specification.

This invention relates to a combined clamping and supporting device for supporting and clamping the hose of a train air-line coupling during the assembling of the parts thereof, and the object of the invention is to provide a novel and effective form of clamp operable to support and hold the clamp in a position to permit of the convenient attachment of the permanent clamping member which is designed for holding the rubber hose to the coupling member or nipple.

Figure 1:
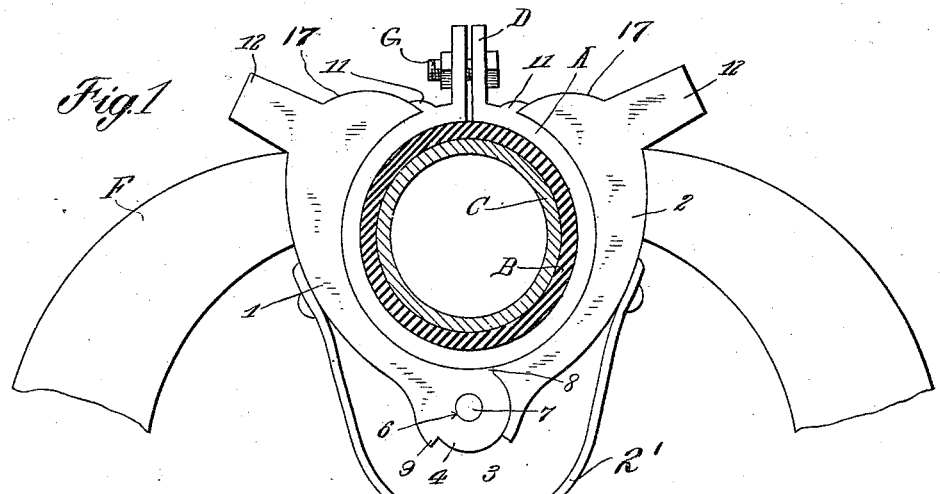
Figure 2:
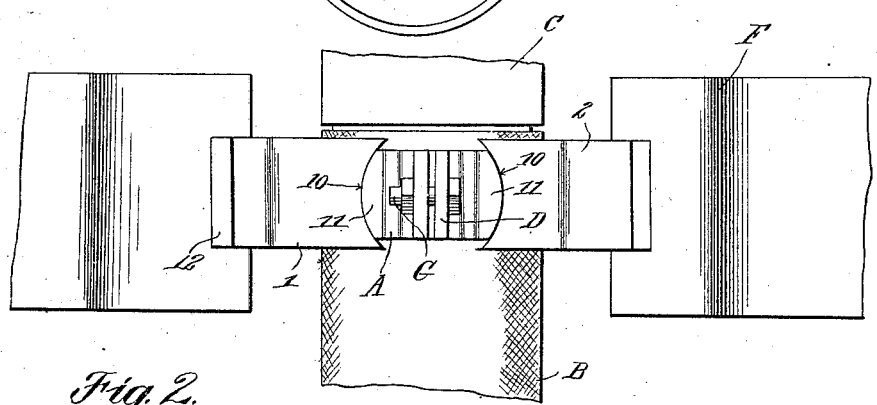
Figure 3:
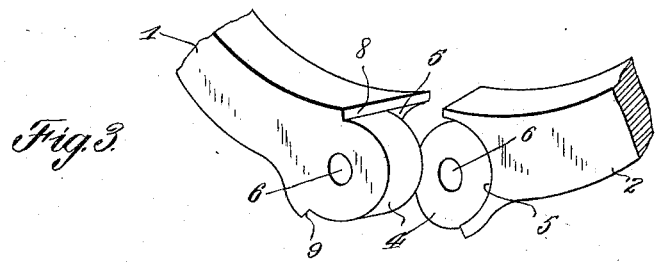

In the drawing, forming a portion of this specification and in which like numerals of reference indicate similar parts in the several views:—Figure 1 is a front view of my improved support and clamp showing the same positioned between the jaws of a vise. Fig. 2 is a top plan view thereof. Fig. 3 is a fragmentary perspective view of the joint portions of the jaws of the device.

My improved support and clamp consists of companion clamping spring-tension jaws 1 and 2 which are formed at their lower ends to provide a knuckle joint 3, each member being formed at such joint to provide a cylindrical head 4 and a substantially semi-cylindrical concavity 5, it being obvious that the head 4 of the member 1 is designed to fit the concavity 5 of the member 2 and vice versa. The spring 2′ is of flat leaf form and its opposite ends are fixed to the jaws 1 and 2, as shown in Fig. 1 of the drawing. The said heads 4 are formed to provide alining passages 6 for the reception of a pivot pin 7. The said jaw members are formed to provide coöperating upper stop shoulders 8 and similar coöperating lower stop shoulders 9. The shoulders 8 are designed to engage each other to limit the closed movements of the jaws and the shoulders 9 are provided to limit the outward movements of the jaws. Each shoulder is of a width equal to the transverse area of its jaw member so that the strain applied to such members will be equally distributed. The jaw members are provided with arcuate gripping surfaces 10 which are operable to engage the correspondingly formed shoulders 11 on the permanent clamp A of the hose B of the coupling herein shown. It will of course be understood that the office of the said permanent clamp A of the coupling is to hold the hose to the coupling member or nipple C. The permanent clamp is provided with spaced ears D which extend above the jaws of the vise F when my improved clamp and supporting device is in its applied position. The ears of the said permanent clamp are apertured for the reception of the clamping bolt G. The jaw members 1 and 2 are formed to provide oppositely extending stop lugs 12 which are designed to rest upon the upper edge portions of the companion jaws of the vise. The upper surfaces of the jaws 1 and 2 are curved inwardly and downwardly toward the arcuate surfaces 10, as at 17. When the shoulders 8 hereinbefore described are wholly contacting with each other the jaws are slightly open, and, incident to the fact that the jaws are provided with the surfaces 17, a relatively large flared passage is formed at the open end of the clamp so as to facilitate the engagement of the clamp to the hose.

It will be understood that when the vise is adjusted to move the jaws toward each other the jaws 1 and 2 of my improved clamp are correspondingly moved and incident to their engagement with the lugs 11 of the permanent clamp the said clamp will be effectively moved to a closed position to embrace the hose and hold it securely to the nipple C.

The device herein described and shown is extremely simple in construction and in use it affords means for facilitating the association of the said permanent clamp hereinbefore briefly referred to to the hose A of the coupling. The device is constructed with a view of providing means whereby the clamping bolts on the clamp member of the hose coupling will be disposed above the jaws of the vise as shown in Fig. 1 of the drawing to allow the operator to conveniently adjust the same without the jaws of the vise serving in any way as an obstruction.

I claim:

A hose clamp supporting and adjusting device for vises comprising a pair of identically constructed jaws pivoted together at their lower ends, the said jaws being adapted to contact with portions of a split hose clamp adjacent to the terminals of the clamp, the said jaws having surfaces at their upper ends curved inwardly and downwardly toward the first named surfaces, lugs formed on the jaws and engaging the jaws of the vise so that on movement of the jaws of the vise toward each other the jaws of the support will be correspondingly moved, shoulders formed on the lower pivoted ends of the jaws, and a spring having end portions fixed to the jaws of the support, the said spring operating to hold the shoulders in contact with each other, and the shoulders operating to hold the said pivoted jaws against moving to an entirely closed position.

In testimony whereof I affix my signature in presence of two witnesses.

ANTHONY R. McCORMICK.

Witnesses:
LUCAS HERMANN,
PAUL TRITSCHLER.